Jan. 6, 1953 A. F. KIRKPATRICK ET AL 2,624,236
POLARIZING ATTACHMENT FOR MICROSCOPES
Filed Feb. 5, 1949 2 SHEETS—SHEET 1
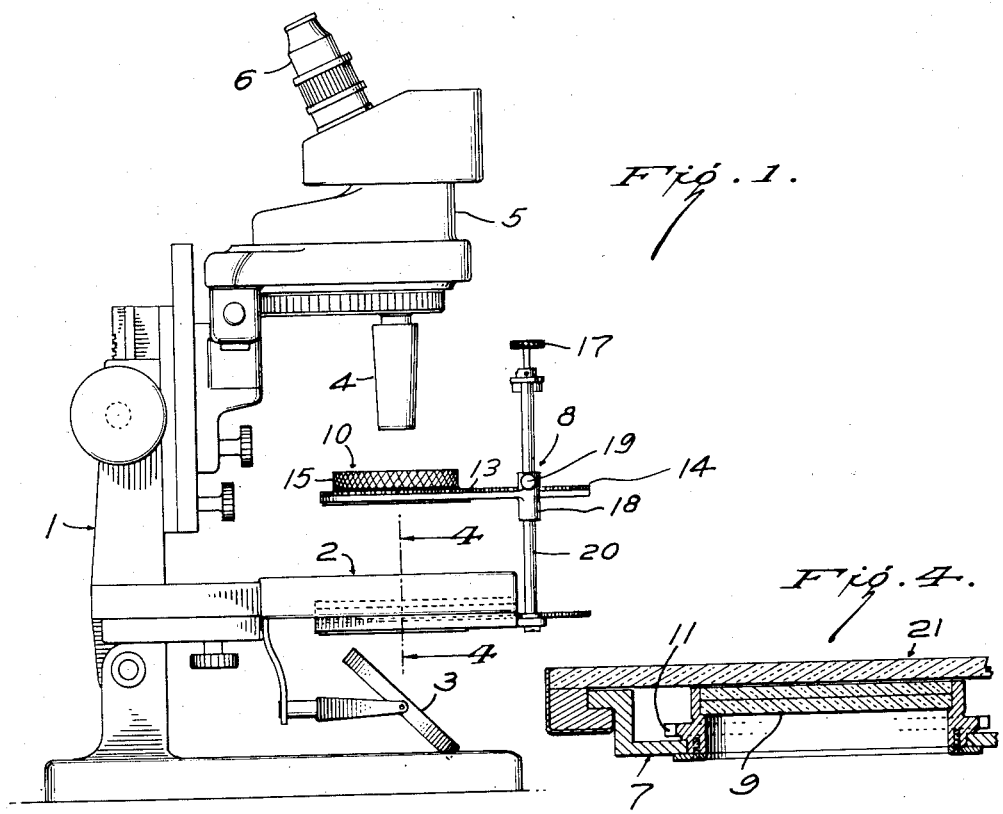
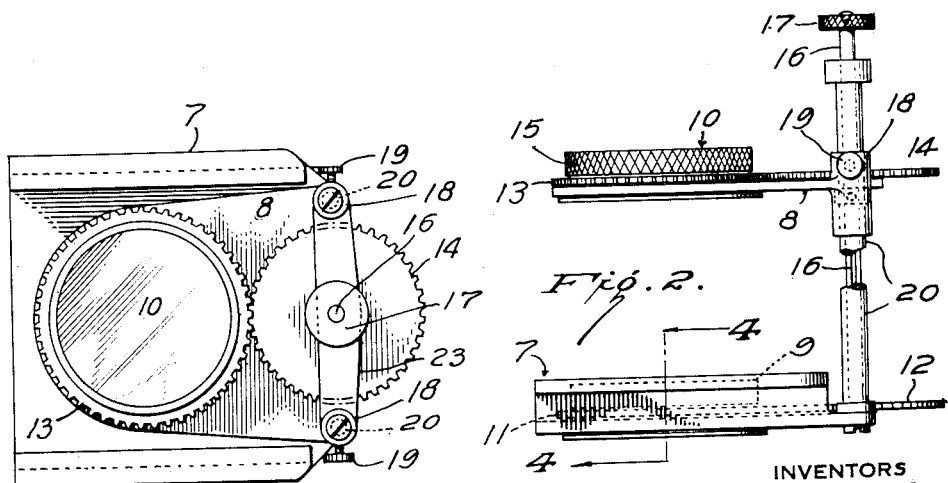
INVENTORS
ALAN F. KIRKPATRICK,
CHARLES R. STRYKER,
BY
ATTORNEY

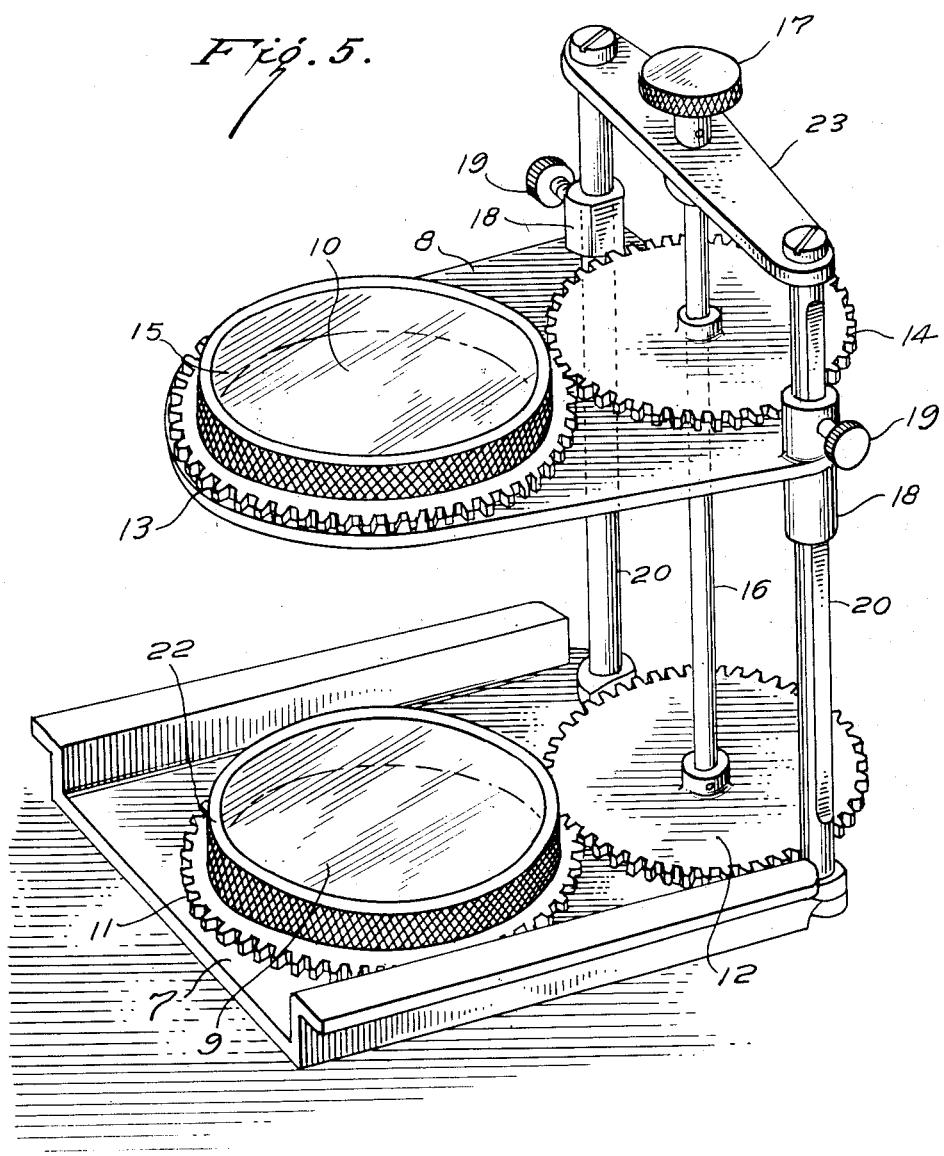

Patented Jan. 6, 1953

2,624,236

UNITED STATES PATENT OFFICE 2,624,236

POLARIZING ATTACHMENT FOR MICROSCOPES

Alan Fred Kirkpatrick, Stamford, and Charles Rule Stryker, Greenwich, Conn., assignors to American Cyanamid Company, New York, N. Y., a corporation of Maine Application February 5, 1949, Serial No. 74,744

3 Claims. (Cl. 88—40)

This invention relates to a device for attachment to microscopes to provide observation with polarized light for the examination of birefringent materials. More particularly, the invention relates to a device applicable to low power binocular microscopes of the Greenough type.

Polarized light has been used extensively in the past for the microscopical observation of birefringence as a manifestation of internal structure. In the ordinary monocular microscope, the provision for equipment to make observations with polarized light is a comparatively simple matter. The polarizer is provided between the source of light and the sample, and an analyzer is incorporated into the barrel of the microscope, or, as an analyzing cap. When such a microscope is provided with a rotatory stage, the advantages of observation with polarized light are fully realized.

The application of polarized light to binocular microscope of the Greenough type, however, has presented a serious problem. It is not feasible to use simple cap analyzers and it is essential to employ microscope optical systems which are entirely strain-free, otherwise, the strain in the elements of the optical systems themselves, will appear in color and will therefore result in masking the colored images obtained of the internal phenomena of the material being observed. Unfortunately, it is not practical to construct binocular stereoscopic microscopes with optical systems that are entirely strain-free. Therefore, this type of microscope has not been considered suitable for many observations with polarized light. This has reduced its field of utility to a material extent.

The present invention provides for fully adjustable polarizer and analyzer located ahead of the objective of the microscope. It is thus not necessary that the optical system of the microscope be strain-free, because no analyzing element is between the microscope optical system and the observer's eye. A further advantage of the present invention is that it provides most of the advantages of a rotatable-stage microscope and thus performs a dual function.

Essentially, the present invention includes a framework capable of sliding over the ordinary stage of the microscope and carrying pillars on which a second framework is movable vertically. Rotatable polarizing elements are mounted in these two frameworks on geared mounts engaging with gears on a shaft permitting manual rotation of the two polarizing elements. One of them is also provided with a friction mount, which permits individual rotation, so that the angular relation of the two elements may be altered and then the two turned as a whole without affecting the angle between them. All the advantages of polarized light microscopy are thus obtained, together with many of the functions of a rotatable stage, but without the complication and added expense of the latter.

The upper polarizing element may be moved vertically, permitting use with various objectives of different working distance.

While the greatest advantages of the present invention are obtained when it is used with a binocular microscope of the Greenough type, which constitutes the preferred use, it should be understood that the device can also be used with other types of microscopes, such as monocular microscopes, although there the advantage is not as great because it is possible to obtain comparable results in these microscopes with suitable optical systems.

The device of the present invention is generally applicable to all microscopes having a sufficiently large working distance to accommodate the two polarizing elements. It is, of course, not suitable for very high powered microscopes, where the working distance is too small to permit the mounting of the polarizers. For many uses, extremely high power is not necessary, and the present invention adapts binocular microscopes with their advantages of great depth of field and stereoscopic affects for the observation with polarized light, and for the distinction between birefringent and non-birefringent material. For the first time it is possible to adapt this type of microscope simply and cheaply and thus the gap gap between the macroscopical examination of crystals and the relatively high powered examination with a petrographic microscope is bridged.

The device of the present invention has the additional advantage that it can be readily removed or inserted, so that it is not necessary to set aside certain microscopes for polarized light investigation. On the contrary, a single microscope can be quickly adapted for use with either ordinary illumination or with polarized light.

The invention will be described in greater detail in conjunction with the drawings in which:

Fig. 1 is a side elevation of a binocular microscope showing the polarizer of the present invention in position;

Fig. 2 is an enlarged side elevation of the device of Fig. 1;

Fig. 3 is a top plan view of the device shown in Fig. 2;

Fig. 4 is an enlarged detail of the lower frame carrying one of the polarizing elements;

Figure 5 is a perspective view of the device shown in Figure 2.

The device of the present invention is illustrated in conjunction with the binocular microscope of the Greenough type, for which it is particularly useful. In Fig. 1, the microscope framework is shown at 1, with a stationary stage 2, and conventional illuminating mirror 3. The top of stage 2 is provided with a glass plate 21, as shown in Figure 4. The microscope itself is provided with an objective 4, the usual binocular body 5, and two oculars 6. The polarizing device includes a bottom framework 7 channeled to slide into complementary channels on the stationary stage, as illustrated in Figures 1 and 4. Frame 7 is provided with rotatable ring-gear 11, which meshes with gear 12 mounted on shaft 16, secured to frame 7. A polarizing element 9, mounted in rotatable mount 22, is disposed within ring-gear 11.

A pair of vertical supports 20 secured to frame 7 at the forward end thereof carry upper frame 8. Frame 8 is slidable vertically on supports 20 by means of sleeves 18, and may be locked in position thereon by means of clamping screws 19. Frame 8 is provided with rotatable ring-gear 13, which meshes with gear 14, which is also mounted on shaft 16. Gear 14 is keyed on shaft 16. A polarizing plate 10, mounted in rotatable mount 15, is disposed within ring-gear 13. Supports 20 are provided at the upper end thereof with crossbar 23, which serves to provide the necessary rigidity to the device. Manual rotation of shaft 16 is accomplished by knurled knob 17, located at the top of the shaft. As will be obvious, since gears 12 and 14 are mounted on the shaft, rotation of the shaft drives gears 12 and 14, which in turn drive ring-gears 11 and 13, respectively, and thus cause rotation in unison of polarizing plates 9 and 10, carried in mounts 22 and 15, disposed within ring-gears 11 and 13.

In operation, the upper framework 8 is slid on the columns 20 to a level permitting a satisfactory working distance for the microscope objective and is clamped in this position. The upper polarizing element 10 is then rotated manually by the knurled mount 15 until it is adjusted to the desired angle with respect to the lower polarizing element 9. Then the two elements can be moved together by rotation of the shaft 16, which turns the ring-gears 11 and 13 by means of the gears 12 and 14. Not only is it possible therefore to have the desired adjustment of the polarizing element, but both can be rotated to give the effect otherwise obtainable only with a rotating stage.

A preferred modification of the device of the present invention is shown, in which the two polarizing elements mounts are driven through gears. This is a very simple and rugged construction and is preferred. Of course, any other drive which will maintain the angular relationships of the polarizing elements may be used instead and the particular modification shown in the drawing is meant to be illustrative only of a desirable and preferred type of drive.

When observations are to be made, both with polarized light and with ordinary illumination, the polarizing adapter of the present invention may be simply slid on to and off the microscope stage, without affecting any of the other adjustments, except for refocussing. It is thus possible to shift rapidly from one type of illumination to the other. When changing the microscope for ordinary illumination to polarized light illumination, and vice versa, it is not necessary to change the adjustment of the microscope because there is no part projecting above the top polarizing element, except the pillars and adjusting shaft, which are in front of the microscope. Likewise, when it is desired to change objectives while the polarizing adapter is in position, it can be simply effected, as there is no projecting part which prevents removing the objective sideways.

A further advantage of the present invention lies in the fact that many of the functions of a rotating stage are obtained without, however, requiring any costly construction, for the adapter is much cheaper to build than the ordinary rotating stage, and yet for polarized light observation, full 360 degree rotation of the polarizer is possible, so that crystalline material can be observed at all angles of orientation.

We claim:

1. A polarizing attachment for a microscope comprising a frame, rotatable mounting means in said frame, a polarizing element supported in said rotatable mounting means, a vertical shaft journalled on said frame, means on said shaft for causing rotation of said mounting means and said polarizing element, a pair of vertical supports secured to said frame and spaced laterally from said shaft, a second frame mounted on said supports and being vertically movable with respect to said first-mentioned frame, said shaft being journalled in said second frame a second rotatable mounting means in said second-mentioned frame, a second polarizing element supported in said second-mentioned rotatable mounting means, means on said shaft engaging with said second-mentioned mounting means and causing rotation of said second-mentioned mounting means and said second-mentioned polarizing element, whereby the rotation of said shaft rotates the said polarizing elements in unison, and means on said first-mentioned frame for detachably securing said frame to the stage of a microscope, said frame when in position on the stage of a microscope being so positioned that one of said polarizing elements is above said stage and the other of said polarizing elements is below said stage.

2. A polarizing attachment for a microscope comprising a frame, a vertical shaft journalled on said frame, a drive gear fixed to said shaft, a driven gear meshing therewith, a rim-mounted polarizing element positioned within said driven gear and supported on said frame, a pair of vertical supports secured to said frame and spaced laterally from said shaft, a second frame mounted on said supports and being vertically movable with respect to said first-mentioned frame, said shaft being journalled on said second-mentioned frame, a second drive gear fixed to said shaft, a second driven gear meshing with said second-mentioned drive gear, a second polarizing element in a rotatable rim mount positioned within said second-mentioned driven gear and supported on said second frame and being mounted for rotation relative to said first-mentioned polarizing element, means for rotating said shaft whereby said polarizing elements are rotated in unison, and channel members on said first-mentioned frame for detachably securing said frame to complementary channels on the stage of a microscope, said frame when in position on the stage of a microscope being so positioned that one of said polarizing elements is above said stage and the other of said polarizing elements is below said stage.

3. A device according to claim 1 in which said second-mentioned polarizing element is frictionally mounted in said second-mentioned rotatable mounting means whereby the angular position of said polarizing elements may be adjusted with respect to each other.

ALAN FRED KIRKPATRICK.
CHARLES RULE STRYKER.

REFERENCES CITED

The following references are of record in the file of this patent:

UNITED STATES PATENTS

| Number | Name | Date |
|---|---|---|
| 2,152,513 | West | Mar. 28, 1939 |
| 2,399,658 | Banker | May 7, 1946 |
| 2,435,953 | Bennett | Feb. 17, 1948 |
| 2,494,078 | Woodruff | Jan. 10, 1950 |